(No Model.)
A. C. BOTH.
LETTER SCALE.
No. 371,920. Patented Oct. 25, 1887.
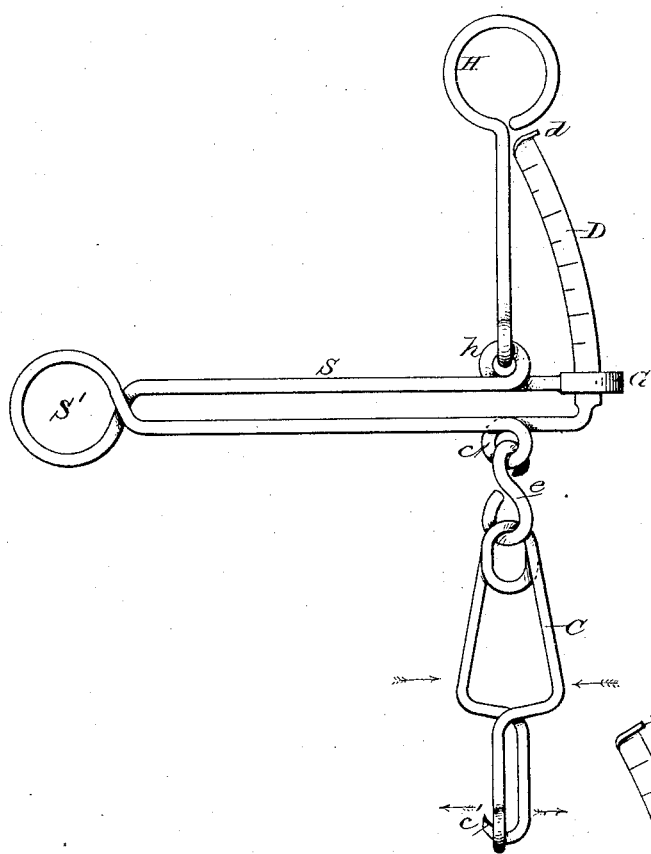
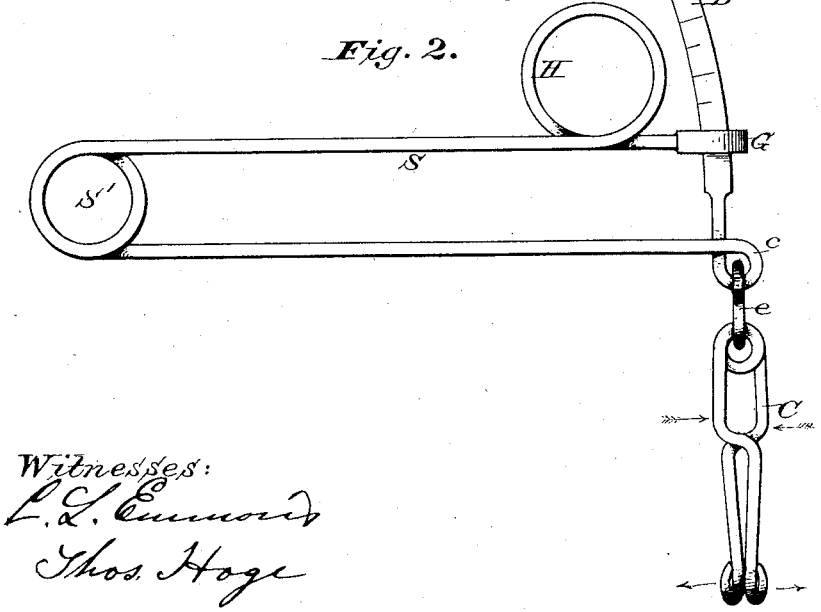
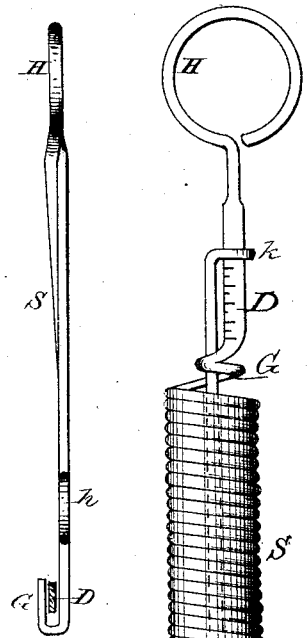
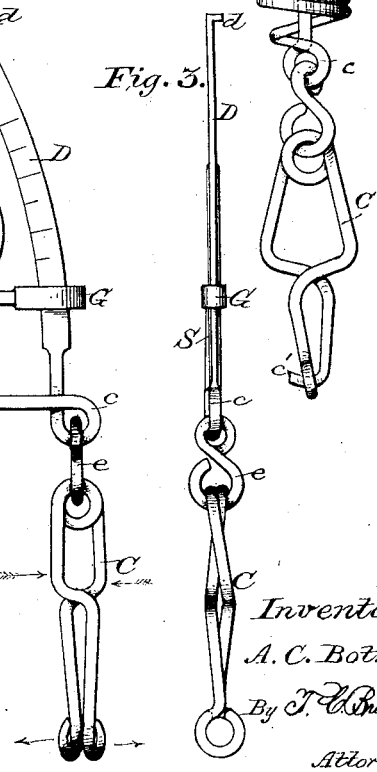
Witnesses:
L. L. Emmons
Thos. Hoge
Inventor:
A. C. Both,
By T. C. Brecht
Attorney.

UNITED STATES PATENT OFFICE.

ADOLPH C. BOTH, OF PORTLAND, MAINE.

LETTER-SCALE.

SPECIFICATION forming part of Letters Patent No. 371,920, dated October 25, 1887.

Application filed September 10, 1885. Renewed September 28, 1887. Serial No. 250,910. (No model.)

*To all whom it may concern:*

Be it known that I, ADOLPH C. BOTH, a citizen of the United States, residing at Portland, in the county of Cumberland and State of Maine, have invented certain new and useful Improvements in Letter-Scales; and I do hereby declare the following to be a full, clear, and exact description of the invention, such as will enable others skilled in the art to which it appertains to make and use the same.

My invention relates to improvements in portable letter-scales, and the object is to produce such a scale for ascertaining the weight of letters, especially in places some distance from cities, towns, &c., and said scale to be carried in a diary, pocket-book, or pocket; that will occupy a very small space; that can be produced at a very small expense and of neat appearance; that is very simple in construction, and therefore not liable to get out of order, and one that is always ready for use.

My invention consists in a letter-scale having its upper and lower arms made of a single wire united by a single loop, and provided with eyes for attachment of a spring-clasp to the lower arm and a handle to the upper arm, as hereinafter claimed.

Like letters indicate similar parts in the drawings, in which—

Figure 1 represents a side view of the letter-scale. Fig. 2 is a modification of the devices shown in Fig. 1. Fig. 3 is an end view of the devices shown in Fig. 2. Fig. 4 is a modification or another form showing a coil-spring and vertical index-plate. Fig. 5 is a detail top view of the arm shown in Fig. 1.

In said drawings, S represents a spring made of any suitable size and material, although spring-wire is preferred, and of about the size shown. Said spring consists of an upper and lower arm united by a loop, S', to produce greater elasticity. The lower arm is provided with a flattened curved scale or curved index-plate, D, at its outer end, and has suitable divisions upon it to indicate the weight of the mail matter to be weighed. The upper arm is flattened and bent at its outer end, as shown in Fig. 5, and forms a guide, G, for the scale or index-plate. The upper end of the scale or plate D is bent, as at $d$, to form a stop and prevent said scale or plate being pulled out of the guide, and also to prevent the spring (while weighing) from being overstrained. The scale or plate is made, preferably, out of the same piece of wire with the arms and coil.

In close proximity to the scale or plate end a handle, H, is attached, which is either made in one piece with the spring-arms or it may be attached to an eye, $h$, on said arm. An eye, $c$, is formed in the lower arm at its junction with the scale or plate, to which a spring-clasp, C, is connected. This clasp consists of two short arms overlapping each other, and one of these arms is provided with a point, $c'$, to penetrate the envelope, and it passes through an eye formed in the other arm.

To operate the clasp the arms are pressed upon by the fingers, as indicated by the arrows, (see Fig. 1,) and the letter is inserted. The arms are then let go, when the letter is held until the weight is ascertained, and it can then be withdrawn.

In the modification shown in Fig. 2 the handle H is made in one piece with the upper arm, and preferably the clasp has no point $c'$, both arms being alike, and the letter is held between the arms and is not penetrated.

In the modification shown in Fig. 4 a coiled spring, S, is employed, having a scale or index-plate, D, made straight and in one piece with the spring. The upper end is formed into a handle, H. The lower end is formed into an eye, $c$, to which is attached the spring-clasp C. After forming the eye the wire is turned upward through the spring, and forms at its upper end a guide, G, for the scale or index-plate. In this instance the handle, spring, and guide are also preferably made of one piece.

These scales can be made ornamental—may be silver or gold plated or galvanized. They will be found to be very convenient and handy; will occupy a very small space, especially the flat ones; the scales are always ready for use, and when the letter is placed in the spring-clasp it is only necessary to hold the scales up by the handle, and the weight can be ascertained.

I am aware of the letter-scale, Patent No. 186,267, of Nott, and disclaim the construction therein shown; but,

Having thus described my invention, what I claim, and desire to secure by Letters Patent, is—

The letter-scale described, consisting of an upper and a lower arm, a single loop uniting the two arms, an index-plate, D, attached to one of said arms, an eye, c, and a spring-clasp, C, having two arms twisted, bent, and crossed, as shown and set forth.

In testimony whereof I affix my signature in presence of two witnesses.

ADOLPH C. BOTH.

Witnesses:
A. B. SUMNER,
W. T. COMSTOCK.